United States Patent

[11] 3,557,311

[72] Inventor Albert B. Goldstein
Highland Park, Ill.

[21] Appl. No. 695,268
[22] Filed Jan. 2, 1968
[45] Patented Jan. 19, 1971
[73] Assignee Compumatics, Inc.
a corporation of Delaware

[54] INFORMATION TRANSMISSION SYSTEM INCLUDING A UNIT FOR PRODUCING A PRINTED RECORD OF INFORMATION TRANSMITTED
9 Claims, 5 Drawing Figs.

[52] U.S. Cl. .......... 179/2, 179/90
[51] Int. Cl. .......... H04m 11/00
[50] Field of Search .......... 179/100, 90AIN, 90ADO, 100D, 90K, 90BO, 2DP, 100, 20P; 235/150, 151.2, 151.21, 151.22, 168; 178/17A, 17C, 79, 80, 81; 340/365

[56] References Cited

UNITED STATES PATENTS

| | | | |
|---|---|---|---|
| 2,362,702 | 11/1944 | Krieger .......... | 235/150 |
| 2,407,411 | 9/1946 | Folis .......... | 340/365 |
| 2,684,996 | 7/1954 | Potts .......... | 179/2(DP) |
| 2,969,439 | 1/1961 | Dubois .......... | 179/90(K) |
| 3,413,423 | 11/1968 | Stevko .......... | 179/100(D) |

*Primary Examiner*—Kathleen H. Claffy
*Assistant Examiner*—Randall P. Myers
*Attorney*—Bair, Freeman & Molinare

ABSTRACT: An arrangement for transmitting data over a telephone line by means of signalling tones and for simultaneously recording this data at the transmitting station. In the embodiment disclosed, the signalling tones are produced by depressing keys on a tone-signalling telephone set by means of a first group of solenoids. The printed record of the transmitted data is provided by depressing keys on an adding machine by means of a second group of solenoids. The two sets of key-depressing solenoids are energized by switches which are opened and closed by manipulating the keys on a third keyboard.

INVENTOR.
ALBERT B. GOLDSTEIN
BY Bain, Freeman & Molinare
ATTORNEYS

PATENTED JAN 19 1971

3,557,311

SHEET 2 OF 2

INVENTOR
ALBERT B. GOLDSTEIN

BY Baer, Freeman & Molinare

ATTORNEYS

INFORMATION TRANSMISSION SYSTEM INCLUDING A UNIT FOR PRODUCING A PRINTED RECORD OF INFORMATION TRANSMITTED

BACKGROUND OF THE INVENTION

This invention relates generally to data transmission and recording systems.

A single electronic digital computer, by using recently developed "time-sharing" techniques, may be employed to service a large number of remote terminals. In such a system, data is often transmitted from the remote locations to the computer by means of telephone transmission facilities. These facilities normally include equipment at the remote terminal for translating the input data to be supplied to the computer into a form compatible with telephone transmission systems; that is, into a sequence of multiplexed audio tones.

While the available remote terminal equipment has proven to be quite satisfactory for may applications, its use is economically unfeasible at locations having a relatively low volume of use. For example, such sophisticated equipment would normally not be installed at a location where only a few thousand "bits" of information are to be transmitted daily. Consequently, where data must be collected from a large number of such low volume remote locations, "real-time" or "on-line" operation of a computer system is normally considered impractical due to the cost of the transmission equipment required.

Where information is to be sent to a distant data collection center, it is also desirable to provide an accurate, easily readable record of the information transmitted. Such a record is particularly useful where the data is transmitted manually by a keyboard operator. By providing the operator with a printed record of the data as it is being sent, the accuracy of the transmission may be more easily monitored.

SUMMARY OF THE INVENTION

The present invention operates in conjunction with a telephone subscriber "station-set" of the type employing a plurality of signalling-tone sources coupled to the telephone transmission line and selectively actuated in response to the depression of keys on a first keyboard. In addition, the invention utilizes a printing unit capable of recording selected printed characters in response to the depression of keys on a second keyboard. In accordance with a principal feature of the invention, means linking the two keyboards are employed for simultaneously depressing corresponding keys on both keyboards such that the information transmitted over the telephone line by the signalling tones is simultaneously recorded by the printing unit.

DESCRIPTION OF THE PREFERRED EMBODIMENT

Figures 1, 1A:
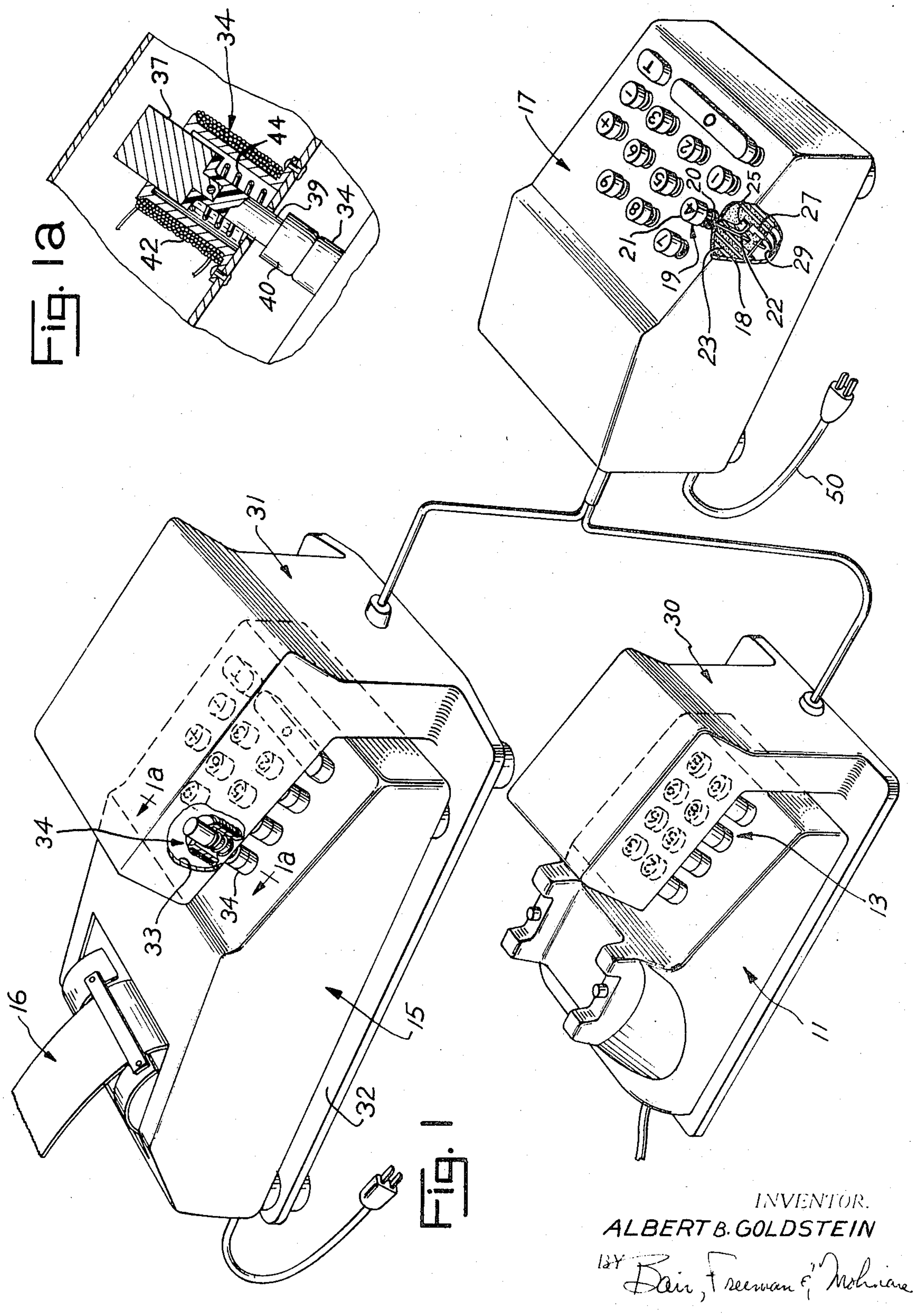
FIG. 1 is a perspective view of a data transmitting and recording system which embodies the invention.
FIG. 1A is an enlarged cross-sectional view of a key depressing solenoid mechanism which may be used to implement the invention.

The preferred embodiment of the invention shown pictorially in FIG. 1 is capable of transmitting data to a distant data collection center over conventional telephone facilities and simultaneously recording this data at the transmitting station.

The data is transmitted in the form of signalling tones which are produced by depressing keys on a tone-signalling telephone set. Tone-signalling subscriber sets are readily available from most telephone utilities and, though such sets take a variety of forms, they are typified by the unit leased by the Bell System and designated by the trademark "TOUCH-TONE". As the term "tone-signalling telephone set" is used herein, however, it should be understood to encompass any type of telephone terminal equipment in which signalling is accomplished by manipulating a keyboard to selectively apply one or more signalling tones to the transmission line.

The tone-signalling telephone set illustrated in FIG. 1 is provided with a keyboard comprising ten buttons for designating the ten decimal digits. A three-by-three array of buttons is used to specify the digits 1 through 9 while the 0 is specified by a tenth button centered below the aforementioned array.

In addition to the tone-signalling telephone set, the present invention also makes use of a keyboard operated recording device (such as a conventional adding machine, typewriter, keypunch apparatus, etc.) wherein information is recorded permanently or semipermanently. Such a recording device is typified by the adding machine shown by way of illustration in FIG. 1 at 15. The keyboard of the adding machine also employs buttons corresponding to the decimal digits one through zero and, in addition, three other buttons marked +, − and T (for addition, subtraction and totaling respectively). A permanent record of the information keyed into the adding machine 15 appears on paper tape at 16.

As contemplated by the present invention, means linking the keyboard of the tone-signalling telephone set 11 and the keyboard of the adding machine 15 are employed for substantially depressing corresponding keys on both keyboards such that the information transmitted over the telephone line by the signalling tones is recorded on the paper tape 16.

In the preferred embodiment of the invention illustrated in FIG. 1, the keyboard buttons on both the telephone set 11 and the adding machine 15 are depressed by means of solenoids which are energized in response to the depression of a corresponding button on an operating keyboard unit indicated generally at 17 in FIG. 1. The housing of the operating keyboard unit 17 is cut away at 18 to show the details of the button operated switch mechanism 19. A spring 20 is employed to hold the button 21 of switch 19 in a normally raised position. An elongated shaft 22 is rigidly fastened to the underside of button 21 and extends downward through the keyboard face of the housing of unit 17 and through an opening in a circuit board 23 which is positioned substantially parallel with the keyboard face. A flexible switch contact 25 is attached to the shaft 22 and, when the button 21 is depressed, contact 25 engages with a "printed" metallic plating contact 27 on the circuit board 23. A conductor 29 is soldered to the contact plating 27.

The shaft 22 and flexible contact 25 are grounded to the case of the operating keyboard unit 17. Therefore, when the switch 19 is depressed, the conductor 29 is also grounded momentarily. As will be pointed out in more detail in conjunction with the schematic diagram of FIG. 2, the grounding of conductor 29 has the effect of energizing the solenoids which operate to depress the 4 key on both the tone-signalling telephone set 11 and the adding machine 15.

The telephone set 11 and the adding machine 15 are detachably mounted on keying units 30 and 31 respectively. The two keying units each house solenoids which serve to simultaneously depress selected keys on the keyboards of the telephone set 11 and adding machine 15. The two keying units are quite similar in construction. By way of example, the adding machine 15 rests on a flat base section 32 which is an integrally molded part of the housing for the keying unit 31. The unit 31 contains a plurality of key depressing solenoids, one of which can be seen through the cut away portion 33 in the housing of unit 31. This solenoid is indicated generally at 34 and operates the 7 key 35 on the keyboard of adding machine 15.

The details of the solenoid 34 are more clearly pictured in the enlarged, cross-sectional view of FIG. 1A. The solenoid 34 includes an armature made up of the axially aligned combination of a ferrous slug 37 and a nonferrous (nonmagnetizable) shaft 39. A rubber cup 40 is fitted over the lower end of shaft 39 and engages with the key 34. The shaft 39 and slug 37 are surrounded by a magnetizing winding 42. The armature of the solenoid is held in normally raised position by means of a compression spring 44. When the magnetizing winding is energized, the slug 37 is drawn into the region surrounded by the winding 42, hence forcing the shaft 39 and the cup 40 downward, depressing key 34.

The solenoids employed to depress the remainder of the buttons on the keyboard of the adding machine 15 as well as the keyboard of the tone-signalling telephone set 11 may be constructed in an identical fashion to that pictured in FIG. 1A. Other types of solenoids may, of course, be substituted for the unit described.

Figures 2, 3, 4:
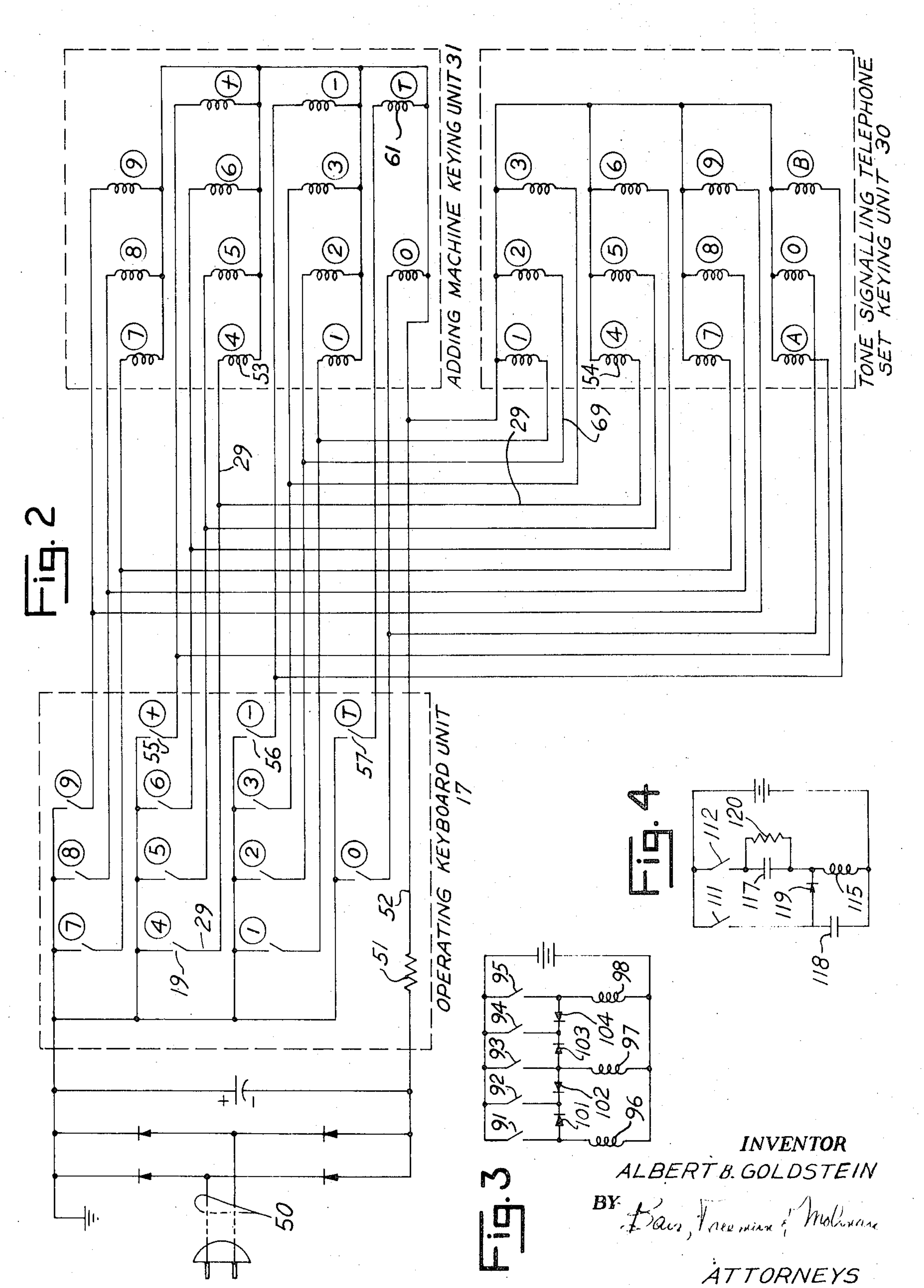
FIG. 2 is a schematic diagram showing circuitry which may be employed in an arrangement of the type shown in FIG. 1.
FIGS. 3 and 4 are schematic diagrams of alternative circuits which may be employed to produce coded tone signalling.

FIGS. 2 of the drawings is a schematic illustration of a preferred method of interconnecting the operating keyboard switches in unit 17 with the keying units 30 and 31.

Power for the arrangement is obtained from a conventional AC source and is supplied through power cord 50.

A conventional diode bridge rectifier, the positive output terminal of which is grounded, supplies a negative voltage through a resistor 51 to a voltage supply conductor 52. Conductor 52 is connected to one lead of each and every solenoid in the system.

Individual solenoids are energized by the depression of a button on the operating keyboard unit 17. The switch mechanism 19, described above in connection with FIG. 1, as well as each of the remaining operating keyboard switches, acts as a single-pole, singe-throw switch which serves to energize a selected solenoid in keying unit 30 and a selected solenoid in keying unit 31. By way of example, when the switch 19 (associated with the 4 button on the operating keyboard) is closed, conductor 29 is grounded, allowing current to pass through the adding machine solenoid 53 as well as the tone-signalling telephone set solenoid 54. Solenoids 53 and 54, when energized, serve to depress the 4 keys on the adding machine 15 and on the telephone set 11.

It may be noted that the operating keyboard 17 includes the ten decimal numeral keys plus three additional keys (as does the adding machine 15). These additional +, − and T keys are connected to the switches 55, 56, and 57 respectively as shown in FIG. 2. The switches 55 and 56 are connected to solenoids in keying unit 30 which operate to depress the two extra keys A and B positioned on opposite sides of the 0 key on the telephone set 11. Telephone sets having such additional keys are available from most utilities to meet specialized signalling needs.

It may be noted that, in the arrangement shown schematically in FIG. 1, switch 57 associated with the "total" key on operating keyboard unit 17 is connected only to the solenoid 61 in the adding machine keying unit 31. Switch 57 is not connected to any solenoid in the telephone keying unit 30 since there are no remaining keys not already being employed for other symbols.

Thus, where the total number of different symbols which it may be necessary to transmit exceeds the total number of available keys on the tone-signalling telephone set, it is necessary to resort to a form of coding. The coded data transmitted to the remote location may then be "translated," if necessary, into signals representative of the original symbols.

One straight forward coding scheme which may be employed involves depressing not one but two or more keys on the tone-signalling telephone set each time a single symbol is to be transmitted. An illustrative arrangement for depressing either one or a selected plurality of keys simultaneously is shown in FIG. 3 of the drawings. Five "input" key switches 91 through 95 are connected to selectively energize three solenoids 96, 97 and 98. Isolating diodes 101 through 104 provide a simple logic circuit for selecting one or more solenoids for energization in response to the closure of one of the keying switches 91 through 95. For example, when switch 91 is closed, solenoid 96 only is energized, diode 101 serving to block current flow through solenoid 97. When switch 92 is closed, however, both solenoids 96 and 97 are energized.

It should be noted that some tone-signalling telephone sets are provided with "interlock circuits" which prevent the depression of a key from having any effect when another key has already been depressed. In such cases, switching means must be employed to send the plural tones in sequence rather than simultaneously.

Another coding scheme which may be employed involves transmitting tone signals of different durations to indicate different symbols. A simple arrangement for instrumenting this coding approach is shown in FIG. 4. Two "input" keying switches 111 and 112 are interconnected with a single solenoid 115 by means of a timing circuit comprising capacitors 117 and 118, a diode 119, and a resistor 120.

When switch 112 is closed, solenoid 115 is energized for only a limited time whereas, when switch 111 is closed, solenoid 115 is energized for a sustained period. The moment switch 112 is closed, current begins to flow through the circuit including the parallel combination of capacitor 117 and resistor 120. The capacitor 117 allows an initial surge of current to flow but quickly blocks the flow of current to deenergize the solenoid 115. Resistor 120 permits capacitor 117 to discharge between closures of switch 112 but has a sufficient resistance to limit the current flow to the solenoid 115 to a low value after capacitor 117 blocks. The diode 119 prevents capacitor 118 from being charged when switch 112 is closed. Capacitor 118 is promptly charged as soon as switch 111 is closed and maintains the energization of solenoid 115 for a sustained delay period after switch 111 opens. Thus, even though switch 111 is closed only momentarily, the solenoid 115 remains energized for a detectably longer duration than when energized through switch 112.

The embodiment of the invention which has been described possesses several advantages which should be noted. It is wholly unnecessary to make any electrical connection to the telephone subscriber set nor is there any "acoustic" coupling required. The telephone need not be removed from the keying unit when conventional telephone signalling is being carried out since the telephone number desired can be "dialed" by manipulating the operating keyboard. The printing unit may be selected from a variety of conventional, inexpensive units already in mass production. Using the coding techniques described, alphanumeric information may be transmitted and recorded.

When an adding machine is used as the recording unit, numerical information previously transmitted may be totaled and this total then transmitted for comparison with a computer generated total at the receiving station. In this way, a simple check against transmission errors may be carried out.

The + and − keys may be used to transmit special notations to the receiving station. Using an adding machine of the type shown in FIG. 1 as the recording unit, the printed record is created by pressing the + key after the number to be sent has been keyed in. With the printed record of the number just sent now raised before the keyboard operator, a quick visual check of keying accuracy is made. If the number was keyed correctly, the + key is pressed a second time. If the number was keyed incorrectly, the − key is struck to direct the receiving station to disregard the number last transmitted. By keying a −+, the end of a record segment may be indicated. Similarly, a −− transmission may be used to indicate the end of a transmission.

It is to be understood that the embodiment of the invention which has been described is merely illustrative of one application of the principles of the invention. Numerous modifications may be made to the disclosed embodiment without departing from the true spirit and scope of the invention.

I claim:

1. In combination, a tone-signalling telephone set provided with a first keyboard, a recording unit provided with a second keyboard, and means linking said first and second keyboards for simultaneously actuating corresponding keys on said keyboards whereby the sequence of keys depressed on said first keyboard for transmitting data from said tone-signalling telephone set is recorded by said recording unit.

2. A combination as set forth in claim 1 wherein said recording device is a key operated adding machine.

3. A combination as set forth in claim 1 wherein said means linking said keyboards includes a third keyboard and means responsive to the manipulation of said third keyboard for simultaneously depressing keys on said first and second keyboards.

4. Apparatus adapted to operate in conjunction with a telephone subscriber station set of the type employing a plurality of signalling-tone sources coupled to a telephone transmission line and selectively actuated in response to the depression of keys on a first keyboard, said apparatus comprising, in combination:

a printing unit capable of recording selected printed characters in response to the depression of keys on a second keyboard; and means linking said first and second keyboards for depressing keys on both of said keyboards substantially simultaneously such that the sequence of keys depressed on said first keyboard for transmitting information over said telephone line by said signalling tones is recorded by said printing unit.

5. Apparatus as set forth in claim 4 wherein said printing unit is a key operated adding machine.

6. Apparatus as set forth in claim 4 wherein said means linking said keyboards comprises a plurality of solenoids positioned adjacent at least one of said keyboards, each of said solenoids being operatively associated with one of said keys to depress said one key, and electrical switching means for selectively energizing said solenoids to depress the associated keys substantially simultaneously with the depression of the corresponding keys on the other of said keyboards.

7. Apparatus as set forth in claim 6 wherein said switching means are actuated by manipulation of a third keyboard.

8. Apparatus adapted to operate in conjunction with a tone signaling telephone set employing a plurality of tone-signalling sources coupled to a telephone transmission line and selectively actuated in response to the depression of keys on a first keyboard, comprising, in combination:

a printing unit having a second keyboard and a plurality of keys on said second keyboard said keys on said second keyboard having alphanumeric printing characters associated therewith said printing characters selectively actuated in response to depression of keys on said second keyboard; and means linking said first and second keyboards for depressing keys on both of said keyboards substantially simultaneously such that a printed record is produced by said printing unit representative of the sequence of keys depressed on said first keyboard.

9. Apparatus as set forth in claim 8 wherein said printing unit is a key operated adding machine.